United States Patent [19]

Bahl et al.

[11] 4,419,674

[45] Dec. 6, 1983

[54] WIRE WOUND FLAT-FACED CHARGE PLATE

[75] Inventors: Surinder K. Bahl; Margene C. Howell; Loy D. Pace, all of Dayton, Ohio

[73] Assignee: Mead Corporation, Dayton, Ohio

[21] Appl. No.: 348,476

[22] Filed: Feb. 12, 1982

[51] Int. Cl.³ .............................................. G01D 15/18

[52] U.S. Cl. ...................................................... 346/75

[58] Field of Search ........................... 346/1.1, 75, 140; 310/195; 335/279

[56] References Cited

U.S. PATENT DOCUMENTS

| | | | |
|---|---|---|---|
| 3,373,437 | 3/1968 | Sweet | 346/15 |
| 3,404,221 | 10/1968 | Loughren | 46/75 X |
| 3,579,810 | 5/1971 | Moh | 29/625 X |
| 3,586,907 | 6/1971 | Beam | 346/75 X |
| 3,604,980 | 9/1971 | Robertson | 346/75 X |
| 3,618,858 | 11/1971 | Culp | 346/75 X |
| 3,656,171 | 4/1972 | Robertson | 346/1.1 |
| 3,813,675 | 5/1974 | Steffy | 346/75 |
| 4,026,011 | 5/1977 | Walton | 29/625 |
| 4,112,436 | 9/1978 | Cone | 346/140 |
| 4,175,338 | 11/1979 | Takinishi | 35/35 R |
| 4,198,643 | 4/1980 | Cha et al. | 346/75 |
| 4,223,321 | 9/1980 | Kenworthy | 346/75 |

FOREIGN PATENT DOCUMENTS 55-159981 12/1980 Japan .
55-159982 12/1980 Japan .

OTHER PUBLICATIONS

Nickols et al., "Ink Jet Charge Plate Fabrication," IBM Technical Disclosure Bulletin, vol. 20, No. 5, Oct. 1977, pp. 1939–1940.

Pedersen, "Ink Jet Charge Plate", IBM Technical Disclosure Bulletin, vol. 19, No. 2, Jul. 1976, p. 673.

Hoekstra et al., "Fabrication of Slotted Charge Structures for Ink Jet Printing", IBM Technical Disclosure Bulletin, vol. 19, No. 4, Sep. 1976, pp. 1471–1472.

*Primary Examiner*—Donald A. Griffin
*Attorney, Agent, or Firm*—Biebel, French & Nauman

[57] ABSTRACT

A planar-faced charge plate having individual charge electrodes uniformly spaced along one end face thereof is provided by wrapping a length of wire around a nonconductive charge plate support structure so that individual wire segments are positioned in parallel spaced relationship across the end face. Notches may also be formed along the opposite end faces of the charge plate support structure to facilitate the positioning of the wire segments. The wire is then adhered to the structure and the wire along one face of the structure is severed to form individual charge electrodes having leads traversing at least the top face of the structure. The end face having the charge electrodes is lapped to form a parallel face. This at times requires the removal of adhesive and/or insulation as well as a portion of the outwardly facing surfaces of the charge electrodes to form the planar-faced structure.

13 Claims, 7 Drawing Figures

WIRE WOUND FLAT-FACED CHARGE PLATE

BACKGROUND OF THE INVENTION

This invention relates generally to ink jet printing systems, and more particularly to a charge plate and method of fabrication of a charge plate for use in an ink jet printing system.

In ink jet printers, such as the systems shown by Sweet et al., U.S. Pat. No. 3,373,437, which print on a moving web with uncharged ink drops while deflecting and catching charged drops, charge electrodes have performed the critical function of selectively charging the ink drops. The drops of ink are formed from fluid filaments which emerge from orifices in an orifice plate communicating with an ink fluid reservoir in which electrically conductive ink is maintained under pressure. By stimulating the orifice plate or the fluid in the reservoir, the fluid filaments emerging from the orifice plate are caused to break up into uniformly sized and spaced drops. As each drop breaks off from a fluid filament, it is selectively charged or left uncharged in a predetermined pattern by an associated charge electrode. The drops then pass through an electrostatic deflection field with the charged drops being deflected into and caught by a drop catcher. The uncharged drops remain undeflected and continue past the deflection field to impact on a moving print web in a readable pattern.

Charge electrodes previously used in the art have comprised an electrically conductive material coated or otherwise deposited onto a nonconductive substrate. Many such electrodes have partially or wholly surrounded the corresponding ink jet stream and extended uniformly along the stream for a distance of at least several drop diameters. Because of the tendency of the ink drops to break off from the filaments at different points, the electric field produced by the charge electrode must be uniform along the length of the ink filaments so that drops may be properly charged without regard to their exact breakoff points. Early patents to Loughren, U.S. Pat. No. 3,404,221, and Sweet et al., U.S. Pat. No. 3,373,437, utilized cylindrically shaped hollow rings or tubes or U-shaped channels as charge electrodes. However, the accurate placement of the tubes or channels into a support structure and electrically connecting such devices to a signal source was both difficult and time consuming, especially in multijet systems utilizing hundreds of individual streams of ink drops spaced only fractions of millimeters apart.

Several workers in the art have attempted to reduce the difficulty and expense of forming charge electrodes. For example, Beam et al., U.S. Pat. No. 3,586,907, shows a charge ring plate with a series of holes therein and having a coating of an electrically conductive material surrounding each hole and extending along the walls of the hole forming charge rings. Electrical lead lines are also plated onto the surface of the charge plate and extend from each charge ring to a connection point. The techniques involved in plating the walls of the holes to obtain a continuous and uniform coating are complex and involve plating in several dimensions. Likewise, coating the U-shaped channels shown in Culp, U.S. Pat. No. 3,618,858, with an electrically conductive material also involves plating in several dimensions.

Another example of forming charge electrodes is shown by Robertson, U.S. Pat. Nos. 3,604,980 and 3,656,171, in which a dielectric planar surface has plated thereon a series of strips of electrically conductive material, each connected to a charging signal source. Robertson differs from previous prior art charge electrodes in that the conductive strips do not surround or partially surround the drop streams. However, the formation of the conductive strips still involves plating in several dimensions.

Kenworthy, U.S. Pat. No. 4,223,321, also, like Robertson, utilizes a flat face charge plate having individual electrodes formed by filling spaced apart grooves in the face of a nonconductive substrate with electrically conductive solder and lapping off excess material. The electrical connections to each electrode are formed by masking and vapor deposition techniques. However, the shrinkage of the solder during solidification and the complexity of forming the electrical connections still presents problems in obtaining a uniform and reliable charge plate.

Accordingly, the need still exists in the art for a relatively simple method for forming a multiplicity of uniformly spaced charge electrodes to form a charge plate for an ink jet printing system.

SUMMARY OF THE INVENTON

In accordance with one embodiment of the present invention, a planar charge plate having charge electrodes uniformly spaced along one end face thereof is fabricated by initially wrapping a length of wire around opposite end faces of a blank charge plate support structure having upper and lower surfaces to form regularly spaced wire segments across one end face of the support structure. The blank support structure may be of any suitable dielectric material including fiberglass laminates, molded polymeric resins, glass, or machinable glass ceramics and are shaped to have at least one end face normal to said upper surface. Positioning of the wire segments may be facilitated by the formation of notches in the opposite end faces of the support structure. The notches in the faces of the support structure blank may be formed by any of a number of known techniques including chemical etching, molding or casting, and sawing or cutting. Preferably, the notches are obtained by grinding with a diamond wheel which yields a square or rectangular cross-section. The shape of the notches is not critical. For example, there are known techniques for accurately arisotropically etching and spacing a series of V-shaped notches along the end face of certain ceramic support structure.

The diameter of the wire and depth of the notches are chosen so that the wire extends outwardly beyond the end faces of the support structure. The diameter of the wire preferably approximates the width of the notches. The spacing of the notches is determined by the desired density of the jet drop streams which will be issuing from the orifice plate so that there will be a corresponding wire segment for each individual stream. The spacing between the notches on the face of the support structure opposite the face which will hold the charge electrodes may be increased to make later electrical connections more convenient.

Once the wrapping has been completed, a suitable adhesive composition such as an epoxy resin is cast over all surfaces of the charge plate support structure and wire. This secures the wire to the support structure and prevents any undesirable movement of the wire during later stages of the fabrication process as well as in later use. The adhesive also acts as an electrical insulator for the wire if bare wire has been used. The adhesive should be applied to a thickness which will completely cover the wire. In another embodiment of the invention, wire having an electrically insulting sheath thereon may be wrapped around the charge plate blank support structure and secured by an adhesive composition.

In one embodiment of the invention, the wire is then removed all along the length of one end face as well as the bottom surface of the partially fabricated structure to form a multiplicity of individual wire segments traversing only the opposite end face and top surface of the structure. This may be done by cutting off or abrading the end face and bottom surface of the structure. Then, the epoxy resin and/or insulative sheath covering the wire segments on the opposite end face are removed to expose the individual regularly spaced wire segments and form charge electrodes. Preferably, the face is lapped using an abrasive to provide a planar-faced charge plate structure by removing at least a portion of the outwardly facing portions of the wire segments.

In another embodiment of the invention, after the adhesive has been applied, the wire is then severed only along the length of one end face of the partially fabricated structure to form a multiplicity of individual wire segments traversing the top surface, opposite face, and bottom surface of the structure. This may be done by cutting off or otherwise removing the edge of the structure. Then, the epoxy resin and/or insulative sheath covering the wire segments on the opposite end face is removed to expose the individual regularly spaced wires and form charge electrodes. Again, the face is preferably lapped to provide a planar-faced charge plate structure by removing at least a portion of the outwardly facing portions of the wire segments.

In both embodiments of the invention, electrical lead connections are then formed by exposing the ends of the wires on the top surface, as well as the bottom surface in the alternate embodiment, of the charge plate structure by abrading away a portion of the layer of adhesive. In the alternate embodiment of the invention, every other wire on both the top and bottom surfaces of the support structure is shortened to provide for more ready accessability to connect the longer wires to a junction box or flexible printed circuit lead cables.

The alternate embodiment of the invention has the additional advantage of leaving substantial lengths of wire secured to both the top and bottom surfaces of the charge plate structure which aid in the charge electrodes remaining secured in position against any undesirable movement. The planar charge plate structure of the present invention is particularly useful when placed in an ink jet printer of the type disclosed in Cha et al., U.S. Pat. No. 4,198,643.

Accordingly, it is an object of the present invention to provide an electrode charge plate structure and method of manufacture for use in an ink jet printing head which is simple to fabricate, yet provides uniformly sized and spaced charge electrodes.

DESCRIPTION OF THE PREFERRED EMBODIMENTS

Figure 1:
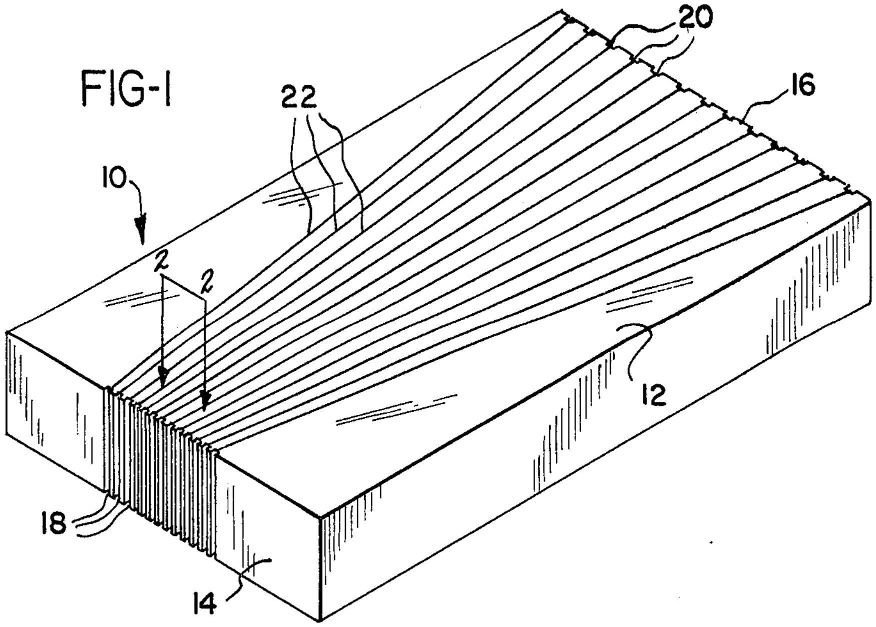
FIG. 1 is a perspective view of a partially fabricated charge plate structure having regularly spaced notches along opposite end faces thereof with a length of wire wrapped about the structure.

Referring now to FIG. 1, an electrically nonconductive charge plate support structure 10 having an upper surface 12 and opposing end faces 14 and 16 has a plurality of regularly spaced notches 18 and 20, respectively formed therein. Preferably, face 14 is perpendicular to upper surface 12. When positioned in an ink jet printing head, the surface of face 14 will be positioned parallel to the direction of flow of the streams of ink drops.

Charge plate support structure 10 may be fabricated of any suitable nonconductive material such as glass, ceramic, machinable ceramics, fiberglass laminates, molded polymeric resins, or the like. Examples of suitable substrate materials include Fotoceram and Macor ceramic material available from Corning Glass Works, Corning, N.Y. Notches 18 and 20 are formed in support structure 10 by a saw blade, diamond wheel, or by other known techniques in the art. For example, if the support structure is formed by casting a polymeric resin into a mold and curing, an appropriately shaped mold will impart regularly spaced notches to the finished support structure.

Preferably, the notches extend along the entire vertical length of the end faces 14 and 16 of the support structure 10 and have a square or rectangular cross-section. Of course, notches having other geometries, such as V-shaped notches, may be utilized as long as they produce regularly spaced parallel notches in which the wire forming the charge electrodes may be secured. Moreover, the forming of notches in the end faces of the support structure may be omitted, and the wire wrapped tightly around the structure. The notches merely aid in holding the wire in a correct position until the later application of adhesive.

The width of the notches, as well as their spacing, may vary depending upon the resolution requirements of the particular jet printing system in which the finished charge plate is to be installed. For example, in a printer using jet drop streams on 0.0028 inch centers, the notches on the end face where the charge electrodes are located should be approximately 0.0013–0.0015 inches wide, 0.0007–0.0010 inches in depth, and spaced on the same 0.0028 inch centers. As shown in FIG. 1, the spacing between notches 20 on end face 16 may be increased to make later electrical connections more convenient.

Figure 2:
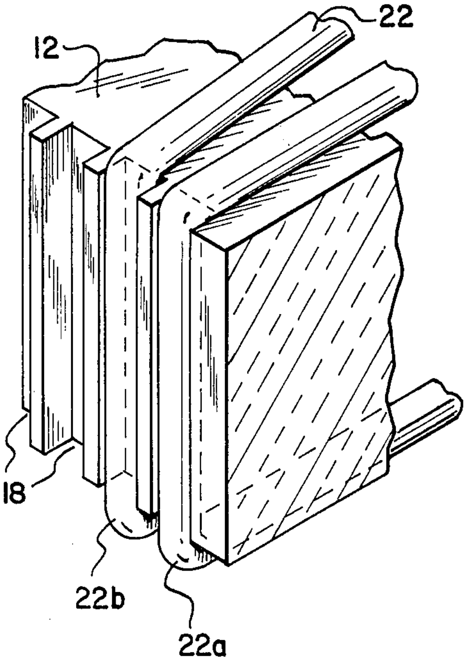
FIG. 2 is an enlarged cut-away section taken along line 2—2 in FIG. 1 and illustrating the wire resting in adjacent notches.

After the notches 18 and 20 have been formed in faces 14 and 16, respectively, the individual charge electrodes are formed by initially wrapping a length of wire 22, which may be of copper or other ductible metal, around support structure 10 so that individual wire segments **22*a*, 22*b*, 22*c*, . . . 22*n*, where n is an integer determined by the total number of charge electrodes formed on end face 14, are positioned in adjacent notches 18 and 20 along the opposing end faces 14 and 16. As best shown in FIG. 2, the diameter of wire 22 and the depth of the notches are chosen so that wire segments 22*a* . . . 22*n*** extend outwardly beyond end face 14 of support structure 10. For example, the diameter of the wire should preferably be approximately twice the depth of the notches and approximately equal to the width of the notches.

Once the wrapping has been completed, a suitable adhesive composition such as an epoxy resin 24 is cast over all of the surfaces of the charge plate support structure 10 and wire 22 and cured. A suitable epoxy resin is Stycast 2058 available from Emerson and Cuming, Inc., Northbrook, Ill. This secures the wire 22 to support structure 10 and prevents any undesirable movement of the wire during later stages of the fabrication process as well as in later use in an ink jet printing head. The epoxy resin 24 also acts as an additional electrical insulator between adjacent wire segments.

Figure 3:
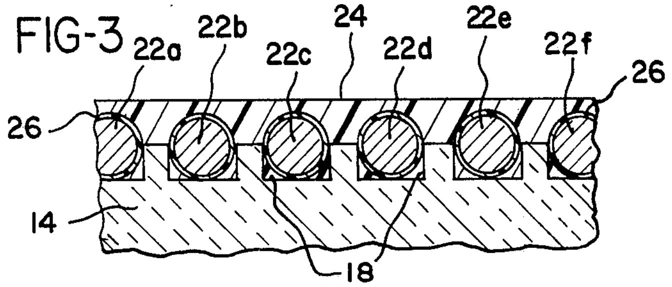
FIG. 3 is an enlarged side sectional view illustrating the wire embedded in an adhesive layer applied over the notches.

Referring now to FIG. 3, wire 22 having an insulating sheath 26 of Teflon or enamel has been utilized to wrap charge plate support structure 10. Preferably, epoxy resin 24 is applied to a thickness which will completely cover the wire segments 22*a* . . . 22*n*.

Figure 4:
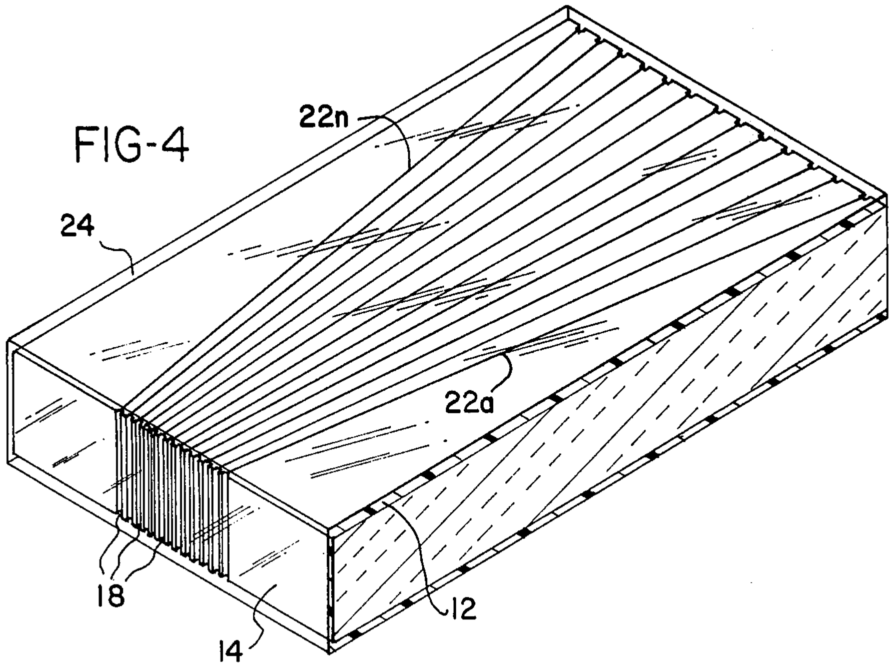
FIGS. 4, 4*a*, and 4*b* are perspective views of completed planar charge plates structure in accordance with this invention.

As shown in FIG. 4, the wire on opposite face 16 of the support structure as well as the bottom surface of support structure 10 is then removed, preferably by an abrading or lapping procedure using, for example, 350 grit boron nitride or aluminum oxide sandpaper. This forms the individual wire segments 22*a* . . . 22*n* which traverse top surface 12 and end face 14 of support structure 10.

Figure 4A:
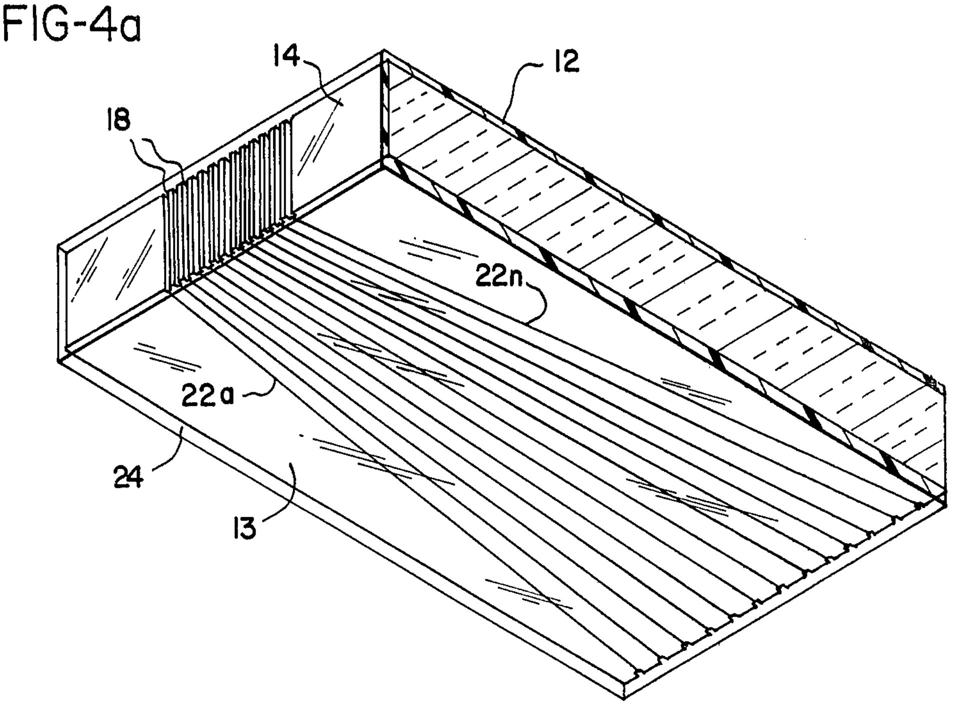

In an alternate embodiment of the invention illustrated in FIG. 4*a*, only the wire on end face 16 is removed, leaving the wire segments traversing both the top and bottom surface 13 of structure 10 as well as end face 14. In that embodiment, the severing of the wire may be accomplished by abrading or lapping off end face 16 leaving the ends of wire segments 22*a* . . . 22*n* to be connected as electrical leads to a flexible wiring cable or junction box.

Figure 4B:
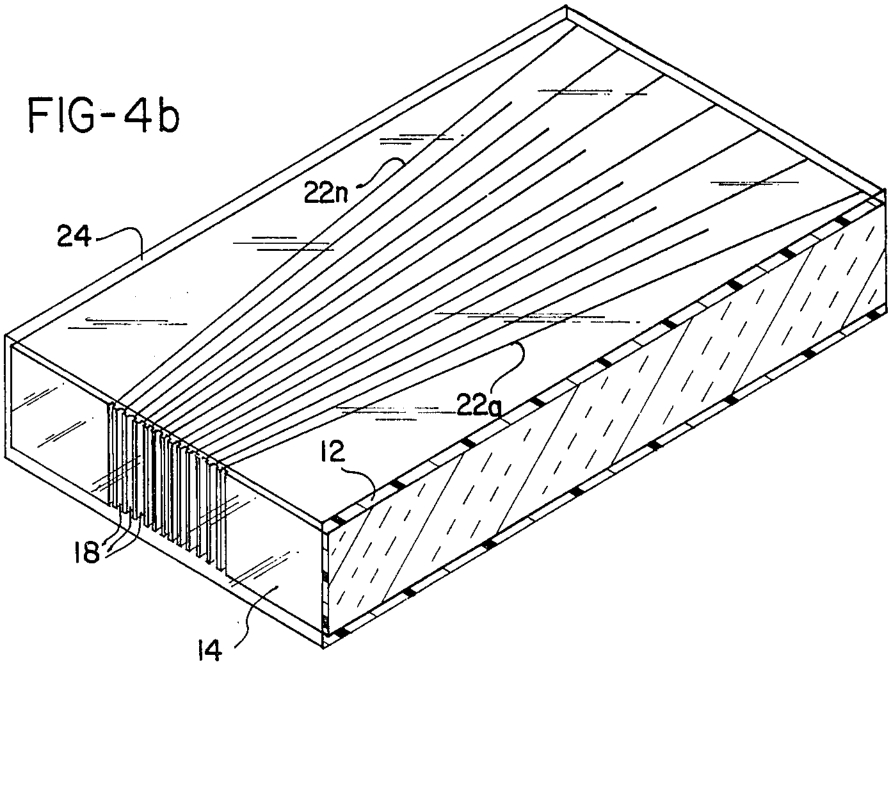

In a yet another embodiment of the invention illustrated in FIG. 4*b*, alternating wires on the top and bottom surfaces of support structure 10 are shortened to provide more ready accesability to connect the longer wires to the desired circuitry after the wire on end face 16 has been removed. However, a substantial portion of wire should be left intact for each individual wire segment to maintain each segment in a secure position. The alternate wires may be shortened by cutting with a sharp knife edge.

Figure 5:
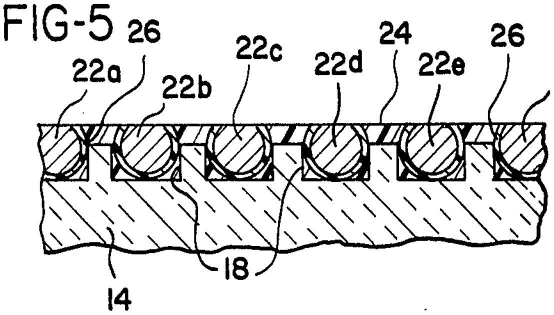
FIG. 5 is an enlarged side sectional view illustrating the planar appearance of the charge electrodes.

In all of the embodiments of the invention, the individual charge electrodes, as shown in FIG. 5, are then formed by removing epoxy resin 24 and portions of insulating sheath 26 from the outwardly facing surfaces of wire segments 22*a* . . . 22*n* to expose the electrically conductive wire. Preferably, the wire segments on end face 14 are exposed by a mild lapping procedure using 1000 grit aluminum oxide, boron nitride, or other abrasive. This lapping procedure results in a planar-faced charge plate structure having regularly spaced, parallel charge electrodes.

While the methods and apparatus herein described constitute preferred embodiments of the invention, it is to be understood that the invention is not limited to these precise methods and apparatus, and that changes may be made in either without departing from the scope of the invention, which is defined in the appended claims.

What is claimed is:

1. A planar-faced charge plate structure comprising,
an electrically nonconductive substrate having an upper and a lower surface, and at least one end face normal to said upper surface,
a plurality of electrically conductive wires extending across at least said upper surface and said end face of said substrate, and
means for securing said wires to said substrate,
the outwardly facing surfaces of said wires along said end face of said substrate being in parallel, spaced coplanar relationship with each other and with said end face and forming charge electrodes.

2. The charge plate structure of claim 1 in which said securing means is epoxy resin.

3. The charge plate structure of claim 1 including a plurality of regularly spaced notches traversing said end face, said wires positioned in respective ones of said notches.

4. The charge plate structure of claim 1 in which said wires extend across said upper surface, said end face, and said lower surface.

5. The charge plate structure of claim 4 in which alternating wires along said upper and lower surfaces of said substrate are of different lengths.

6. A method of fabricating a planar-faced charge plate structure comprising the steps of:
wrapping a length of wire around the upper and lower surfaces and opposing end faces of an electrically nonconductive substrate to provide a series of parallel, spaced wire portions along at least a first end face thereof,
securing said length of wire to said substrate,
severing said length of wire along at least a second end face of said substrate to form a plurality of individual wire segments, and
lapping the outwardly facing surfaces of said wire segments along said first end face to form a series of parallel, spaced coplanar charge electrodes along said first end face of said substrate.

7. The method of claim 6 including the step of initially forming a plurality of regularly spaced notches along said opposite end faces of said substrate and wrapping said length of wire such that individual portions of wire are aligned in respective ones of said notches.

8. The method of claim 7 in which said substrate is made of a ceramic material and said notches are formed by diamond cutting said substrate.

9. The method of claim 7 in which said notches are rectangular in cross-section and are cut by a saw blade into said substrate.

10. The method of claim 6 in which said length of wire is covered with a layer of insulation.

11. The method of claim 6 in which said length of wire is secured in position by epoxy resin.

12. The method of claim 6 including the step of shortening alternate segments of wire on said top and bottom surfaces of said substrate.

13. The method of claim 6 including the step of removing that portion of said length of wire along said lower surface of said substrate.

* * * * *